Figure 4:
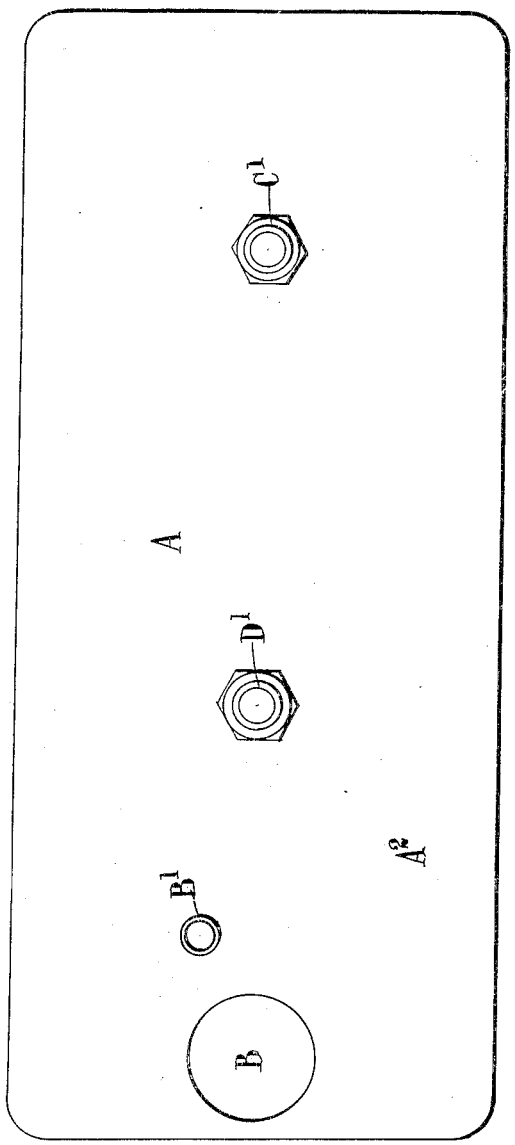

May 27, 1930.  J. E. THORNTON  1,760,220
CINEMATOGRAPH SPOOLCASE
Filed Jan. 26, 1927  2 Sheets-Sheet 1
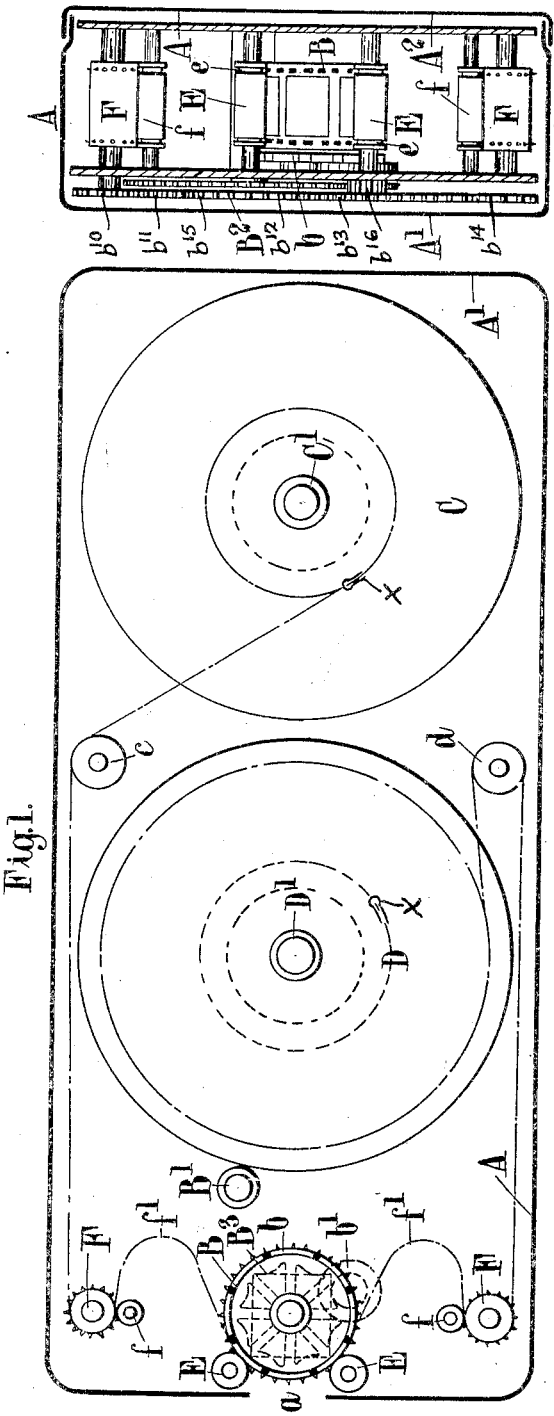

Patented May 27, 1930

1,760,220

UNITED STATES PATENT OFFICE

JOHN EDWARD THORNTON, OF WEST HAMPSTEAD, LONDON, ENGLAND, ASSIGNOR TO JOHN OWDEN O'BRIEN, OF MANCHESTER, ENGLAND

CINEMATOGRAPH SPOOL CASE

Application filed January 26, 1927. Serial No. 163,806, and in Great Britain February 20, 1926.

This invention relates to improvements in spoolcases for cinematograph film apparatus.

The object of the invention is to produce a spoolcase which may be inserted on to the usual spindles for driving the drum and spool of a cinematograph camera or projector whereby the film is permanently protected within the casing of the spoolcase and needs no threading through the camera or projector. The drum and spool are rotated by mechanism on the camera or projector, such mechanism forming no part of the present invention.

The invention consists of a detachable spoolcase comprising in combination with a casing, of a framing mounted within the casing, a drum upon which the film is wound carried by the framing, a hollow spindle passing through one side of the framing upon which the drum is mounted, a spool arranged in line with the drum upon which the film is wound after exposure, a second hollow spindle passing through the side of the framing upon which the spool is mounted, a leader strip permanently affixed at one end to the drum and at the other end to the forward end of the film, a second leader strip permanently affixed at one end to the spool and at the other end to the rear end of the film, a toothed sprocket feed drum and a Maltese wheel, mounted in the framing, over which the film passes and by which it is driven by gearing mounted outside the framing within the casing, whereby the drum and spool are continuously driven and the Maltese wheel intermittently rotated, two further hollow spindles mounted in the framing, a sprocket wheel mounted on each spindle to deliver the film to and from an exposure aperture in the casing, idle rollers carried by the framing to retain the film in contact with the feed drum and apertures in the casing to give access to the hollow spindles.

The invention will be described with reference to the accompanying drawings in which:—

Fig. 1 is a side view with the case in section for use horizontally and having the film-drum placed at the front end of the spool-case, extra sprockets being provided around which the film passes to and from the drum, the film-drum having an intermittent movement and the sprockets a continuous movement.

Fig. 2 is a transverse section of same.
Fig. 2ᵃ is a diagram of the gearing.
Fig. 3 is a longitudinal section of same.
Fig. 4 is a side view of the outside of the case.

In the preferred form of the invention the film feeding and measuring drum B is placed at the front of the spoolcase A adjacent to the aperture $a$ with the supply-spool C and receiving-reel D behind it. These drawings show the invention adapted for a film of single width.

The spoolcase is constructed in two parts $A^1$, $A^2$, which fit over one another like a box and lid (see Fig. 2).

The film-drum B is of small diameter and is driven intermittently by a Geneva or Maltese wheel $b$ affixed to or forming part of the drum and a reflecting prism $B^3$ is arranged inside the drum. Two small rollers E having grooves $e$ to clear the sprocket teeth of the drum B are provided to keep the film pressed close to the drum face in the correct focal curve.

Above and below the drum B is fixed a pair of continuously-driven sprocket rollers F with idle rolls $f$ to keep the film in contact therewith.

Between these continuously-driven sprockets F and the drum B the film describes loops or slack $f^1$. The pull strain or load of the two spools C and D is therefore taken by these two continuous sprockets, and the only load upon the film-drum is the total weight of the small amount of film between the two sprockets F.

Between and above and below the two spools C and D are idle rolls $c$, $d$ which guide the entering and emerging film into the right path to either spool or reel.

A frame G is carried inside the case A which frame supports the drum B, the spools C and D, the spindle carrying the pin wheel $b^1$ which drives the Maltese or Geneva wheel $b$ on the end of the drum, and a second spindle $B^1$ which drives the pin wheel $b^1$ and the sprockets F through the gearing $B^2$.

The gearing $B^2$ comprises a pinion wheel $b^{10}$ on the end of the spindle carrying the sprocket wheel F, gearing with a pinion $b^{11}$ on the framing G which in turn gears with a pinion $b^{12}$ on the spindle $B^1$. The second sprocket wheel F is driven from the pinion $b^{12}$ through a pinion $b^{13}$ carried on the framing G and gearing with a further pinion $b^{14}$ on the spindle carrying the other sprocket wheel F. The pin wheel $b^1$ is driven from the spindle $B^1$ through a second pinion $b^{15}$ thereon gearing with a pinion $b^{16}$ on the pin wheel spindle.

The spindle $B^1$ and the spindle cores $C^1$, $D^1$ of the spools C and D are hollow so as to fit on to projecting spindles in the camera or projector and be driven thereby.

The leader-strips X by which the film is attached to the spool and reel may be of the ordinary type made of paper or film, but I prefer to use those of the unbreakable type, of very strong construction, for example a double thickness of linen tape or a double thickness of paper with a linen tape insertion, the three layers being cemented together, or a double thickness of strong parchmentized paper cemented together.

There are two such leader-strips of long length, one attached to each end of the film, one leader being attached by its other end to the spool and one to the reel. The effect of this arrangement is to permanently connect spool and reel so that either one or the other can be used to give motion to the film-strip; the spool, reel, two leaders, and one film forming a single connected movable unit.

What I claim as my invention and desire to protect by Letters Patent is:—

A detachable spoolcase for use in cinematograph film apparatus comprising in combination with a casing, of a framing mounted within the casing, a drum upon which the film is wound carried by the framing, a hollow spindle passing through one side of the framing upon which the drum is mounted, a spool arranged in line with the drum upon which the film is wound after exposure, a second hollow spindle passing through the side of the framing upon which the spool is mounted, a leader strip permanently affixed at one end to the drum and at the other end to the forward end of the film, a second leader strip permanently affixed at one end to the spool and at the other end to the rear end of the film, a toothed sprocket feed drum and a Maltese wheel, mounted in the framing, over which the film passes and by which it is driven, two further spindles mounted in the framing, a loop forming sprocket wheel mounted on each spindle to deliver the film to and from an exposure aperture in the casing gearing mounted outside the framing within the casing by which the loop forming sprockets are continuously driven and the Maltese wheel intermittently rotated, idle rollers carried by the framing to retain the film in contact with the feed drum and apertures in the casing to give access to the hollow spindles.

In testimony whereof I have hereunto set my hand.

JOHN EDWARD THORNTON.